Patented Mar. 11, 1947

2,417,318

UNITED STATES PATENT OFFICE 2,417,318

METHOD OF PRODUCING 4-HYDROXY PYRIMIDINES

Elmore H. Northey, Bound Brook, N. J., assignor to American Cyanamid Company, New York, N. Y., a corporation of Maine No Drawing. Application July 9, 1945, Serial No. 604,092

8 Claims. (Cl. 260—251)

This invention relates to an improved process of producing 4-hydroxy pyrimidines.

The 4-hydroxy pyrimidines are compounds many of which are used either themselves or as intermediates in the production of other compounds, such as pharmaceuticals. Thus, for example, 2-amino-4-hydroxy pyrimidine, isocytosine; is the starting material for the production of 2-sulfanilamido pyrimidine (sulfadiazine). Another 4-hydroxy pyrimidine which is itself a pharmaceutical, is thiouracil, or 2-mercapto-4-hydroxy pyrimidine. Other two substituted pyrimidines are also of importance, such as 2-methyl-4-hydroxy pyrimidine and 2-cyanoamino-4-hydroxy pyrimidine.

There has been developed a commercial process for producing isocytosine by reacting a sodium formylacetic ester with a guanidine salt, such as for example, guanidine nitrate. This process involved producing the sodium formylacetic ester, which was prepared by reaction of an acetic ester, such as ethyl acetate, methyl formate, and sodium ethylate. This reaction when first used was not as efficient as could be desired, the yields being relatively low, which materially increased the cost of isocytosine.

According to the present invention a crude mixture containing formylacetic ester is obtained by carrying out the reaction of the acetic ester, formic ester and sodium alcoholate, such as sodium methylate, in an atmosphere of carbon monoxide under super atmospheric pressure. This permits the use of elevated temperatures which had hitherto been considered impossible, and it is even possible to dispense entirely with the methyl formate, although its presence results in better yields.

The reaction in the presence of carbon monoxide produces a crude reaction mixture containing sodium formylacetic ester, and we have found, according to the present invention, that this crude mixture without any isolation of the sodium formylacetic ester, may be reacted with the appropriate compound having the structure

in which R is hydrogen, alkyl, amino, cyanoamino or mercapto, to produce the corresponding 4-hydroxy-pyrimidine. In other words, the process of the present invention may be considered as a two-step process in which a crude reaction mixture containing sodium formylacetic ester is produced and this mixture is then reacted in the second stage to produce the hydroxy pyrimidine. The improved yields of formylacetic ester obtainable in the first step of the process are reflected in correspondingly increased yields of the final 4-hydroxy pyrimidine, which permits material reduction in the cost of these compounds. The increased yields are obtained without any disadvantage, as the 4-hydroxy-pyrimidines are readily recovered in suitable purity from the reaction mixture of the second stage.

The invention will be described in greater detail in conjunction with the specific examples, which are illustrative only. The parts are by weight.

EXAMPLE 1

Isocytosine

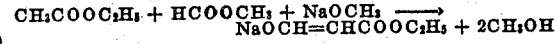

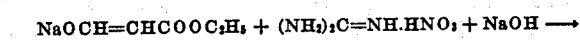

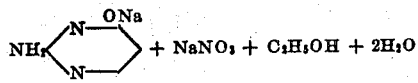

To a steel autoclave equipped with powerful agitation was charged 403.4 parts of methyl formate and 806.6 parts of ethyl acetate (88% real). The mixed esters were refrigerated to −10° C. Then 431 parts (real) of dry sodium methylate were added over 1 hour and 40 minutes' period with maintenance of the temperature at 0 to 10°. The autoclave was sealed and the contents warmed to 60° C. over 1.5 hours. The temperature was held at 60° C. for 2 hours. During this time the pressure in the autoclave rose to 130 lbs./sq. in. The charge was then cooled to 20° C. over a 3 hour period.

The charge in the autoclave was discharged into a well agitated slurry of 620 parts of guanidine nitrate, 500 parts of 50% sodium hydroxide solution and 360 parts of ice. The reaction mixture was allowed to warm up spontaneously to 55° C. and was then held at this temperature for 1.5 hours. The mixture was then cooled to 15° C. and the heavy crystals of sodium isocytosine were filtered. By concentration of the mother liquors an additional 5% of the total yield was recoverable. The sodium isocytosine was dissolved in 1430 parts of water at 90° C., then isocytosine was precipitated by the gradual addition of about 550 parts of 32% hydrochloric acid to pH 7. The slurry was cooled to 15° C., the isocytosine was filtered, washed with cold water and dried. The yield averaged 63% of the theoretical.

EXAMPLE 2

The procedure of Example 1 was followed with application of carbon monoxide to a pressure of 250 lbs. per square inch before heating the mixture of sodium methylate, ethyl acetate and methyl formate. The average yield of isocytosine was increased about 5% by this modification.

EXAMPLE 3

When the procedure of Example 1 was followed but with the reaction time at 60° C. cut to 30 minutes, the yield was decreased about 5%. When the temperature of the reaction was decreased to 25° C. the yield was reduced to about 40% of the theoretical.

EXAMPLE 4

$$CH_3COOC_2H_5 + CO + NaOCH_3 \rightarrow NaOCH=CHCOOC_2H_5 + CH_3OH$$

453 parts of sodium methylate were added to 1162 parts of methanol with stirring, the temperature being kept below 25° C. Then 685 parts of 99% ethyl acetate was added and the clear syrupy liquid resulting was introduced into a nickel-lined autoclave. Carbon monoxide was then introduced under a pressure of 150 to 175 pounds per square inch, a total of about 43 parts of carbon monoxide being absorbed. The autoclave was heated to about 53° C. for 6 hours and then rapidly cooled to room temperature and vented. The thin formylacetic ester slurry was then condensed with guanidine nitrate slurry in the usual manner yielding 77.5 parts of isocytosine.

EXAMPLE 5

Thiouracil

The contents of the autoclave containing sodium formylacetic ester prepared as in Example 1 were discharged to an agitated vessel containing 426 parts of water, 300 parts of ice, 384 parts of thiourea and 116 parts of 50% sodium hydroxide solution. The resulting red solution was recycled through the autoclave to wash and react with the crude sodium formaylacetic ester clinging to the autoclave walls. The solution was held at 15° C. for 5 hours by addition of ice as necessary to a total of about 230 parts. Towards the end of the reaction, a heavy precipitate of disodium thiouracil appeared. After the reaction period, the mixture was diluted to 1.5 times its volume and warmed to 30° C. The slurry became a clear red solution. The crude thiouracil was precipitated by the addition of about 520 parts of 28° Bé. hydrochloric acid to a pH of 5 to 6 and was filtered. The crude cake was washed until the washings were colorless, thereby giving a yield of 785 parts of crude, wet thiouracil.

The crude wet thiouracil was dissolved in seven times its real weight of water (ca. 5000 parts) by the addition of sodium hydroxide to pH 9.5–10.5 (ca. 156 parts). The solution was heated to 90° C. 2.2 parts of sodium dithionite and 0.84 part of hydrated lime were added rapidly. The solution was boiled gently for 5 minutes, cooled to 95° C. and treated with 48 parts of activated charcoal. After 15 minutes the solution was clarified. The finished thiouracil was precipitated at 80° C.–85° C. by the addition of 50% acetic acid until precipitation had started, then 6% hydrochloric acid to a pH of 7 to 8 and 50% acetic acid to a pH of 5 to 6. The slurry was cooled to 30° C., filtered, and washed chloride-free with water. The thiouracil was dried at 70° C. The yield was 444 parts (47% of the theoretical from methyl formate) of pure thiouracil meeting standards of purity for pharmaceutical use. The yield based on thiourea was 78.5% of the theoretical.

EXAMPLE 6

The reaction mixture containing sodium formylacetic ester prepared in the first step of Example 1, was added to a mixture of 155 parts of ice, 99 parts of 50% caustic soda and 535 parts of acetamidine hydrochloride. The resulting red solution was warmed to 55° C. and held at 55° C. for 1.5 hours. The solution was cooled to 25° C. and its pH was adjusted to 4 by the addition of 30% hydrochloric acid. The 2-methyl-4-hydroxy pyrimidine is too water soluble to be isolated at this point. The solution was concentrated by distillation to ⅓ its initial volume. The concentrate was diluted with 1900 volumes of methanol and cooled to 0° C. The 2-methyl-4-hydroxypyrimidine crystallized out and was filtered, washed with methanol at 5° C., and dried at 45° C. The yield was 535 parts (this corresponds to an 88% yield from acetamidine hydrochloride or a 70% yield from methyl formate).

When the procedure described in the literature (Ber. 37, 3639 (1904)) is used, the yield of 2-methyl-4-hydroxy pyrimidine is only 35% from acetamidine hydrochloride and 19% from methyl formate.

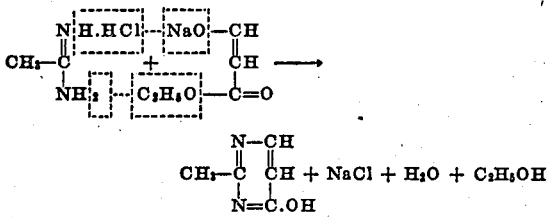

$$CH_3-C\overset{N-CH}{\underset{N=C.OH}{\parallel \quad \parallel}}CH + NaCl + H_2O + C_2H_5OH$$

Melting point 213–214° C.

EXAMPLE 7

The reaction mixture containing sodium formylacetic ester prepared in the first step of Example 1 was added to a mixture of 155 parts of ice, 99 parts of 50% sodium hydroxide and 443 parts of formamidine hydrochloride. The resulting solution was heated to 55° C. and held at 55° C. for 1.5 hours. The solution was cooled to 25° C. and its pH was adjusted to 4 by the addition of 30% hydrochloric acid. The solution was then evaporated to dryness. The residue was treated with 1950 parts of hot methanol. The hot alcoholic solution was treated with 20 parts of activated charcoal for 15 minutes. The charcoal was removed by filtration. The solution was evaporated to dryness, and the residue was dissolved in ethyl acetate by heating. The 4-hydroxy pyrimidine was filtered from the cooled ethyl acetate solution. There was 210 parts of 4-hydroxy pyrimidine. This corresponds to a 39.6% yield from formamidine hydrochloride or a 31.8% yield from methyl formate.

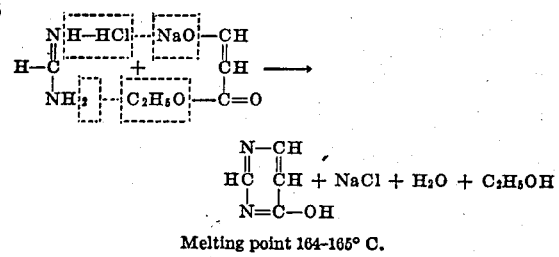

$$HC\overset{N-CH}{\underset{N=C-OH}{\parallel \quad \parallel}}CH + NaCl + H_2O + C_2H_5OH$$

Melting point 164–165° C.

EXAMPLE 8

The reaction mixture containing sodium formylacetic ester prepared in the first step of Example 1 was added to a mixture of 155 parts of ice, 99 parts of 50% sodium hydroxide solution and 460 parts of dicyandiamide. The resulting solution was heated to 55° C. and held at 55° C. for 1.5 hours. The solution was cooled to 15° C. The sodium salt of the 2-cyanoamino-4-hydroxy pyrimidine crystallized out and was filtered off. The wet cake of the sodium salt was dissolved in 1000 parts of water at 85° C. The pH of the hot solution was adjusted to 7 by the addition of 30% hydrochloric acid. On cooling the solution to 15° C. the 2-cyanoamino-4-hydroxy pyrimidine crystallized out and was filtered, washed and dried. There was 625 parts of 2-cyanoamino-4-hydroxy pyrimidine. This corresponds to a 83.5% yield from dicyandiamide or a 67% yield from methyl formate.

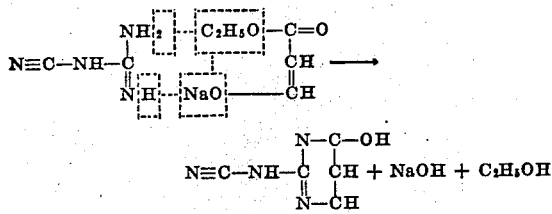

The examples have shown the use of sodium methylate, methyl formate and ethyl acetate. These are respectively the cheapest alkali metals and esters and are therefore preferable for economic reasons. However, the invention is in no sense limited to the use of these particular preferred materials. On the contrary, any alkali metal alcoholate such as the potassium alcoholates may be used and other esters such as methyl, isopropyl or butyl acetate or ethyl or isopropyl formate may be employed.

This application is in part a continuation of my copending application, Serial No. 437,940, filed April 7, 1942.

I claim:

1. A method of producing a 4-hydroxy pyrimidine which comprises reacting an ester of acetic acid with an ester of formic acid and an alkali metal alcoholate under superatmospheric pressure in the presence of an atmosphere of carbon monoxide to produce a strongly alkaline reaction mixture containing alkali metal formylacetic ester, condensing the alkali metal formylacetic ester without isolation thereof with a compound having the formula $$RC\overset{NH}{\underset{NH_2}{\diagup}}$$

in which R is selected from the group consisting of hydrogen, lower alkyl, amino, cyanamino or mercapto to produce the corresponding 4-hydroxypyrimidine.

2. A method of producing a 4-hydroxypyrimidine which comprises reacting ethyl acetate with methyl formate and sodium methylate under superatmospheric pressure in the presence of an atmosphere of carbon monoxide to produce a strongly alkaline reaction mixture containing alkali metal formylacetic ester, condensing the alkali metal formylacetic ester without isolation thereof with a compound having the formula $$RC\overset{NH}{\underset{NH_2}{\diagup}}$$

in which R is selected from the group consisting of hydrogen, lower alkyl, amino, cyanoamino or mercapto to produce the corresponding 4-hydroxypyrimidine.

3. A method of producing isocytosine which comprises reacting an ester of acetic acid with an ester of formic acid and an alkali metal alcoholate under superatmospheric pressure in the presence of an atmosphere of carbon monoxide to produce a strongly alkaline reaction mixture containing alkali metal formylacetic ester and condensing this ester without isolation from the reaction mixture with a guanidine salt.

4. A method of producing isocytosine which comprises reacting ethyl acetate with methyl formate and sodium methylate under superatmospheric pressure in the presence of an atmosphere of carbon monoxide to produce a strongly alkaline reaction mixture containing alkali metal formylacetic ester and condensing this ester without isolation from the reaction mixture with a guanidine salt.

5. A method of producing thiouracil which comprises reacting an ester of acetic acid with an ester of formic acid and an alkali metal alcoholate under superatmospheric pressure in the presence of an atmosphere of carbon monoxide to produce a strongly alkaline reaction mixture containing alkali metal formylacetic ester and condensing this ester without isolation from the reaction mixture with thiourea in the presence of caustic alkali.

6. A method of producing thiouracil which comprises reacting ethyl acetate with methyl formate and sodium methylate under superatmospheric pressure in the presence of an atmosphere of carbon monoxide to produce a strongly alkaline reaction mixture containing alkali metal formylacetic ester and condensing this ester without isolation from the reaction mixture with thiourea in the presence of caustic alkali.

7. A method of producing 4-hydroxypyrimidine which comprises reacting an ester of acetic acid with an ester of formic acid and an alkali metal alcoholate under superatmospheric pressure in the presence of an atmosphere of carbon monoxide to produce a strongly alkaline reaction mixture containing alkali metal formylacetic ester and condensing this ester without isolation from the reaction mixture with formamidine in the presence of caustic alkali.

8. A method of producing 4-hydroxypyrimidine which comprises reacting ethyl acetate with methyl formate and sodium methylate under superatmospheric pressure in the presence of an atmosphere of carbon monoxide to produce a strongly alkaline reaction mixture containing alkali metal formylacetic ester and condensing this ester without isolation from the reaction mixture with formamidine in the presence of caustic alkali.

ELMORE H. NORTHEY.